Patented July 21, 1942

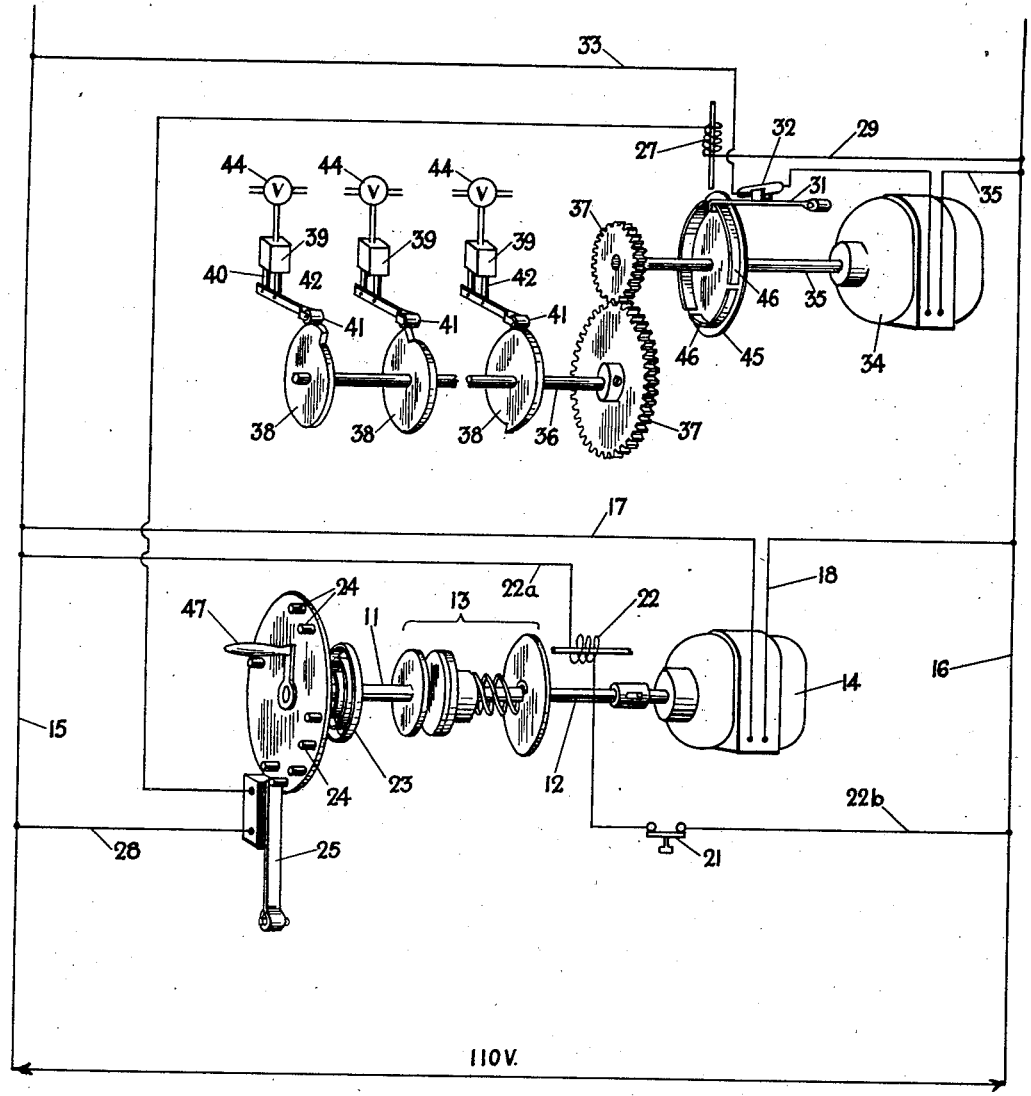

2,290,626

UNITED STATES PATENT OFFICE 2,290,626

SEQUENCE CONTROLLER

George P. Bosomworth, Akron, Ohio, assignor to The Firestone Tire & Rubber Company, Akron, Ohio, a corporation of Ohio Application August 3, 1940, Serial No. 350,541

1 Claim. (Cl. 161—1)

This invention relates to sequence controllers, and more especially it relates to apparatus for controlling the operations of a plurality of remote instrumentalities, such as fluid pressure operated valves, in determinant sequence, and for controlling the cycle of operations of a plurality of interrelated instrumentalities.

The device of the invention mainly comprises one element for setting up impulses, usually electrical, at predetermined time intervals throughout a given cycle, and means for receiving the impulses and changing the operation of the interrelated instrumentalities in a predetermined manner upon receipt of the impulses.

Each time that an impulse is set up, or released by the timing mechanism, the remaining portion of the apparatus operates at least one of a series of relatively low pressure control valves, which valves are suitably connected to remote valve control mechanisms for performing operations upon material being processed. The invention has been found to be of especial utility in the rubber industry for controlling one or more units of apparatus used in the vulcanization of pneumatic tire casings wherein hydraulic pressure is used for closing the tire molds, steam under pressure is used for heating the molds, which pressure is changed several times during the vulcanization cycle, and heated fluid is used for distending the casings within the molds.

The general object of the invention is to provide a novel, improved controller mechanism of the character mentioned.

Other objects of the invention are to provide a controller mechanism which operates at relatively high speed thereby effecting quick and effective valve action; that is adapted to be started and stopped readily and change the operation of the controlled instrumentalities only at predetermined intervals; and to provide an uncomplicated, easily operated control apparatus. Other objects will be manifest as the specification proceeds.

The invention will be described with particular reference to the accompanying drawing which diagrammatically shows apparatus embodying the invention.

Referring to the drawing, a timer disc 10 is shown, which disc is carried on a shaft 11 that connects to a driven shaft 12 through a friction clutch 13. The shaft 12 is constantly driven at a given speed by a synchronous motor 14 which is connected between electrical energy supply leads 15 and 16 by leads 17 and 18. The clutch normally is closed so as to drive shaft 11 whereby the disc 10 constantly is rotated in the direction indicated by the arrow. A stop 19 is provided to engage with means, such as an arm 20 on the disc to limit rotation of the disc in one direction, at which time rotation of the shaft 12 is absorbed in the clutch 13. The timer disc is moved to its starting position by the closing of a manually operated switch 21 which energizes a solenoid 22 connected to leads 15 and 16 by leads 22a and 22b, switch 21 being in lead 22b, said solenoid being arranged to open the clutch 13. A torsion spring 23 operatively connected to the disc 10 moves the disc through a counterclockwise arc to its starting position, when the clutch is opened, which position is determined by the arm 20 on the disc abutting the stop 19. The disc 10 carries a plurality of laterally projecting studs or pins 24 and these studs strike a spring arm 25 and close a switch 26 as the disc is rotated by the motor 14. This energizes a solenoid 27 which is connected between the leads 15 and 16 by leads 28 and 29, the switch 26 being in lead 28. The solenoid 27 is adapted to raise the free end of a ratchet arm 31 that has a mercury switch 32 mounted thereon, said switch being in a lead 33 that connects a motor 34 to lead 15. The motor 34 is connected to lead 16 by lead 35 so that it is started to rotate when the switch 32 is closed, which closing is effected by the raising of the ratchet arm 31.

The motor 34 controls the operation of means that operate a plurality of interrelated instrumentalities which are to be driven through a determinate cycle. To this end the shaft 34a of the motor 34 is connected through reducing gears 37 to a shaft 36. The shaft 36 has a plurality of cams 38 positioned thereon, the cams being of proper shape to control valves 39 by means of cam followers 41 which bear upon the individual cams and have piston rods 42 of the valves 39 connected thereto. The cam followers are pivoted at 40 so that the cam followers are given the desired predetermined movement by the cams and thereby control the position of the piston rods 42. Suitable means, such as pipes 43, lead from the valves 39 to the instrumentalities controlled thereby, which in this case are valves 44. The pipes 43 may be filled with fluid and hydraulically control the valves 44 that in turn control the setting or operation of the related cyclic instrumentalities.

A motor control disc 45 is carried by the shaft 34a and it has a plurality of lugs 46 extending therefrom. These lugs 46 engage with the ratchet arm 31 when it is in its lower position, which arm then prevents rotation of the shaft 34a. Lowering the ratchet arm also opens the mercury switch 32 and opens the electrical energy supply line to the motor 34, the latter being constructed and arranged to stop rotating immediately upon the interruption of its energizing force. The lower surface of the ratchet arm 31 bears on one of the lugs 46 when the arm is raised and keeps the switch 32 closed for a sufficient period to allow the shaft 36 to be rotated through a predetermined arc. When a lug 46 moves out of engagement with the ratchet arm, gravity moves the ratchet arm to its lower position and the motor 34 is stopped. If necessary, some or all of the lugs 46 may be elongated as shown in order to retain the ratchet arm 31 in its raised position to retain the switch 32 in closed position. Of course, the lugs can be irregularly spaced, if desired, and additional means can be provided to retain the switch 32 closed until one of the lugs is moved under the arm 31. Hence current continues to flow to the motor 34 even after a stud 24 has moved beyond the spring arm 25 and the motor continues to operate until stopped by the opening of the switch 32. This leaves the instrumentalities controlled by the valves 44 in a given position or setting for a predetermined length of time after which another stud 24 hits the spring arm 25 whereby a second impulse is sent to the solenoid 27, the switch 32 is closed, and the shaft 36 is driven through a given arc. By rotating the shaft 36 through a predetermined arc, one or more of the cams 38 changes the operation, or setting of the instrumentality controlled by it through its associated valve 44. This setting of the controlled instrumentalities is retained for another predetermined interval, after which the step of starting the motor is repeated whereby another change in the setting of the controlled instrumentalities is effected.

It will be seen that the cycle of related operations of the controlled instrumentalities is effected by driving the shaft 36 through a complete revolution, and the individual cams carried by the shaft are designed for this purpose so that predetermined operation of a series of interrelated instrumenalities is effected at predetermined intervals.

In the application of the apparatus of the invention to the vulcanizing of rubber articles, the timer disc 10 is set up to control the vulcanization cycle from beginning to end, so that said disc is rotated but slowly by the motor 14, and may require 200 or 300 minutes to make a complete revolution. The mold in which vulcanization is effected is initially in open position and the vulcanization apparatus is carried through a complete cycle that comprises closing the mold, introducing steam into the mold, etc. until the vulcanization mold is again opened at the completion of the vulcanization cycle.

After a cycle of operations has been effected, the timer disc can be reset by closing the switch 21, or a handle 47 connected to the disc can be provided for use in rotating the disc back to starting position against the force exerted thereon by the clutch 13.

Although a complete cycle of operation may require an hour or more, the angular, or control movement of the cams, occurring when the motor 34 is rotating, is relatively fast with the result that there is relatively quick valve action which results in efficient operation of the valves. Also, it simplifies adjustment and manufacture of the cams 38.

While one complete embodiment of the invention has been illustrated and described herein, it will be appreciated that various modifications can be made without departing from the scope of this invention as defined in the appended claim.

What is claimed is:

In a sequence controller, the combination of a plurality of apparatus controlling instrumentalities, an electric motor operatively connected thereto and effecting rapid operation thereof, and means energizing said motor periodically for effecting operation of said instrumentalities in determinate sequence, said means comprising a rotary timer disc making less than a complete revolution during a complete operative cycle of the apparatus to be controlled by said instrumentalities, switch means operated periodically by the timer disc for energizing said motor, a second electric motor for driving said timer disc, and means for reversing the movement of the timer disc to return it to point of starting.

GEORGE P. BOSOMWORTH.